US008661785B2

(12) United States Patent
Levin et al.

(10) Patent No.: US 8,661,785 B2
(45) Date of Patent: Mar. 4, 2014

(54) SYSTEM AND METHOD FOR LIQUID REDUCTANT INJECTION (75) Inventors: Michael Levin, Ann Arbor, MI (US); Furqan Zafar Shaikh, Troy, MI (US); Thomas A. McCarthy, Dearborn, MI (US); Bret Alan Zimmerman, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 13/419,830

(22) Filed: Mar. 14, 2012

(65) Prior Publication Data

US 2012/0260629 A1 Oct. 18, 2012

Related U.S. Application Data (60) Provisional application No. 61/475,834, filed on Apr. 15, 2011.

(51) Int. Cl.
*F01N 3/20* (2006.01)

(52) U.S. Cl.
USPC .......... 60/274; 60/286; 60/287; 60/295; 60/296; 60/320

(58) Field of Classification Search
USPC .......... 60/274, 286, 287, 295, 296, 301, 320
See application file for complete search history.

(56) References Cited

U.S. PATENT DOCUMENTS

| 4,684,786 | A | * | 8/1987 | Mann et al. .................... 392/441 |
| 6,125,629 | A | | 10/2000 | Patchett |
| 6,679,200 | B2 | | 1/2004 | Dingle |
| 7,744,837 | B2 | * | 6/2010 | Nissinen et al. ............ 423/213.2 |
| 7,971,426 | B2 | | 7/2011 | Van Nieuwstadt |
| 2005/0091969 | A1 | | 5/2005 | Van Nieuwstadt et al. |
| 2008/0148716 | A1 | * | 6/2008 | Nishibu et al. .................. 60/295 |
| 2009/0031713 | A1 | * | 2/2009 | Suzuki ............................ 60/301 |
| 2009/0301064 | A1 | * | 12/2009 | Maier et al. ..................... 60/286 |
| 2010/0242439 | A1 | | 9/2010 | Domon et al. |
| 2011/0047974 | A1 | | 3/2011 | Henry et al. |
| 2011/0083424 | A1 | | 4/2011 | Wang et al. |

* cited by examiner

*Primary Examiner* — Thomas Denion
*Assistant Examiner* — Jorge Leon, Jr.
(74) *Attorney, Agent, or Firm* — Julia Voutyras; Alleman Hall McCoy Russell & Tuttle LLP (57) ABSTRACT A method for operating a liquid reductant injection system is provided. The method includes storing a reductant mixture of ethanol, water, and urea; drawing the stored mixture into an electrically heated pick-up tube for delivery via a delivery line to the exhaust by operating a pump in a first direction; and, clearing a return line that returns the stored mixture or the delivery line by operating the pump in a second, reverse, direction. In this way, by including ethanol in the reductant solution, a freezing point temperature of the liquid reductant may be reduced.

17 Claims, 5 Drawing Sheets

SYSTEM AND METHOD FOR LIQUID REDUCTANT INJECTION

CROSS REFERENCE TO RELATED APPLICATION

The present application claims the benefit of and priority to U.S Provisional Patent Application No. 61/475,834, filed on Apr. 15, 2011, entitled "SYSTEM AND METHOD FOR LIQUID REDUCTANT INJECTION", the content of which is incorporated herein by reference for all purposes.

TECHNICAL FIELD

The present application relates to a system and a method for delivering liquid reductant solution in an exhaust treatment system of a vehicle.

BACKGROUND AND SUMMARY

Many vehicles utilize catalysts in exhaust systems to reduce emissions. In lean exhaust conditions, such as with regard to diesel exhaust or other lean burning conditions, a catalyst may utilize reductant other than burnt fuel. One such aftertreatment device is a Selective Catalytic Reduction (SCR) system, which uses a catalyst to convert NOx to nitrogen and water. A urea-based SCR catalyst may use gaseous ammonia as the active NOx reducing agent, in which case an aqueous solution of urea may be carried on board of a vehicle, and an injection system may be used to supply it into the exhaust gas stream.

At ambient temperatures of less than −11° C., the aqueous urea solution (comprising 32.5% urea and 67.5% water) may freeze in the on board urea storage tank. Thus, a pick up tube of the injection system may not be able to deliver urea to the injector for delivery to the exhaust gas and NOx reduction. In one approach, the urea storage tank includes an electric heating system to warm the frozen urea. Further, components of the urea storage tank and urea injection system may have a freeze-safe design to assure functionality and survivability of the injection system over multiple freeze/thaw cycles.

The inventors of the present application have recognized a problem in such previous solutions. First, there may be increased cost associated with the heating and freeze-safe components for the urea storage tank and urea injection system. Second, fuel economy may be decreased by using energy produced by the vehicle to heat the entire urea tank, and such heating may take an extended duration, thus reducing the amount of exhaust gases that can be treated catalytically with the reductant, and thus increasing exhaust emissions overall.

Accordingly, in one example, some of the above issues may be addressed by an exhaust system for an engine, the exhaust system including a liquid reductant injection system, and a method for operating the liquid reductant injection system, wherein the method comprises storing a reductant mixture of ethanol, water, and urea; drawing the stored mixture into an electrically heated pick-up tube for delivery via a delivery line to the exhaust by operating a pump in a first direction; and, clearing a return line that returns the stored mixture or the delivery line by operating the pump in a second, reverse, direction.

In this way, by including ethanol in the reductant solution, a freezing point temperature of the liquid reductant may be reduced. As such, the occurrences of reductant freezing may be reduced. If the temperature drops below a precipitate forming threshold, the liquid reductant may be heated by the pick-up tube. Thus, the liquid reductant injection system consumes less energy because heating of the storage tank is not required. Because of these features, the system may require less energy during operation and overall fuel economy may be improved. Further still, pumping of the liquid reductant injection system in a reverse direction may clear delivery and return lines of remaining liquid reductant. This may prevent reductant from precipitating and/or freezing in the delivery and return lines during ambient temperature conditions below the liquid reductant precipitation and freezing points, thereby reducing clogging and improving efficiency of NOx reduction.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Embodiments of an exhaust system and a urea injection system for use with an aqueous urea and ethanol solution are disclosed herein. Such a urea injection system may be utilized for exhaust gas treatment by NOx reduction in various ambient temperature conditions. More specifically, the urea injection system may be used to treat exhaust gas in ambient temperatures below a normal freezing temperature of aqueous urea, as described in more detail hereafter.

Figure 1:
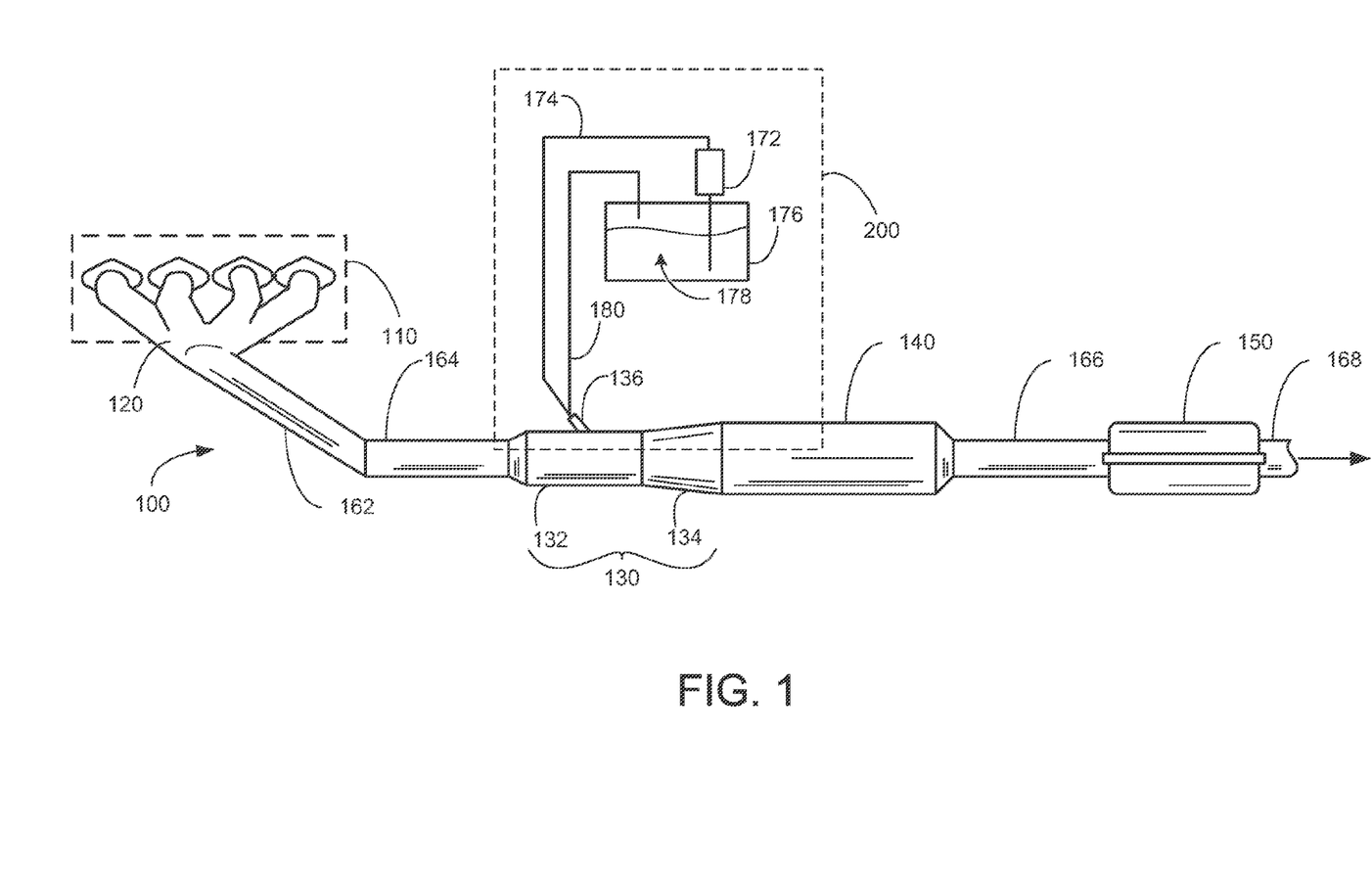
FIG. 1 illustrates an example exhaust system for receiving and treating engine exhaust gas.
Figure 2:
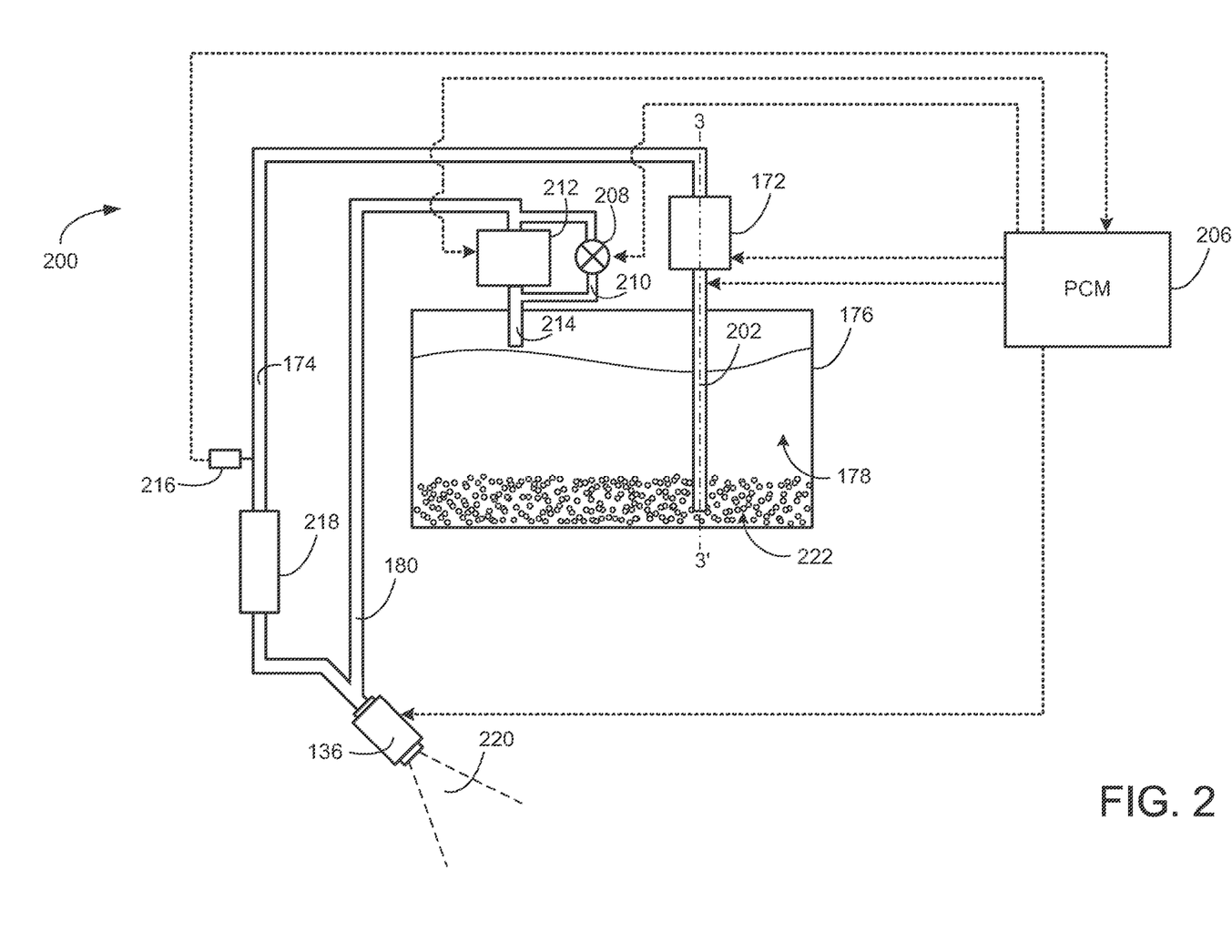
FIG. 2 illustrates an example urea storage tank and urea injection system within the exhaust system of FIG. 1.
Figure 3:
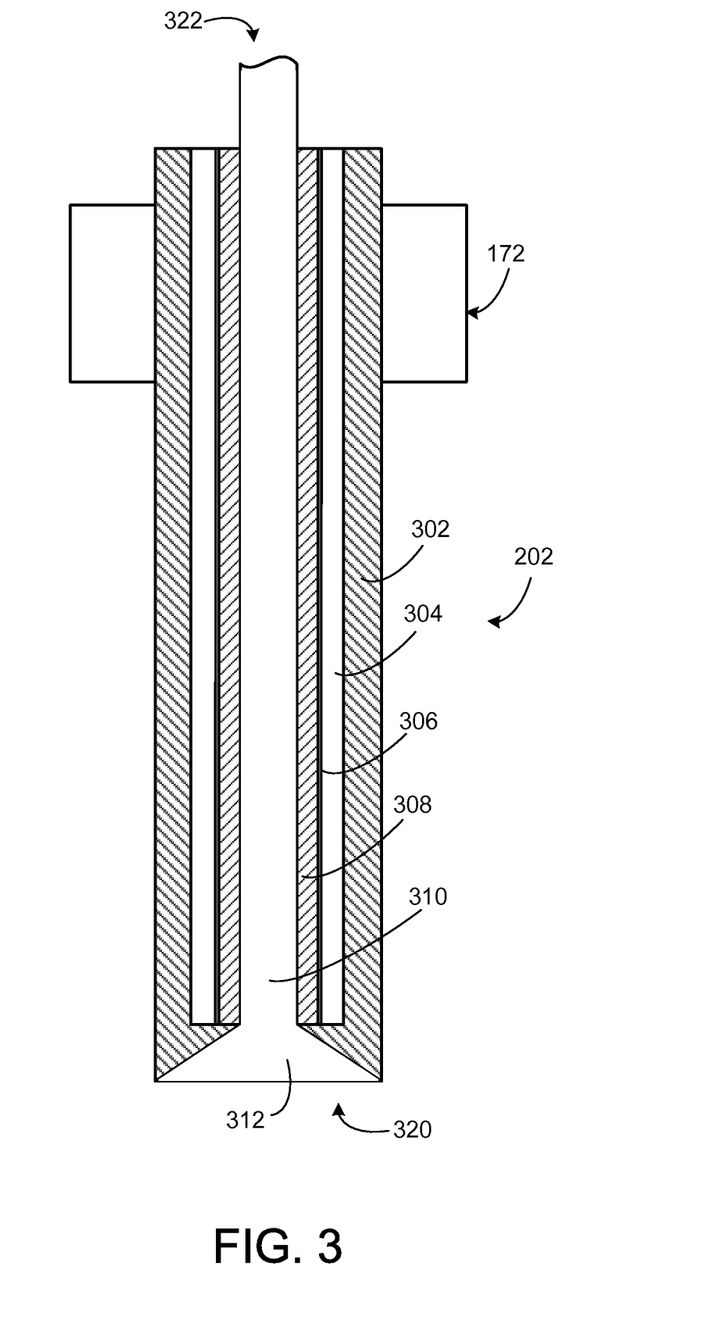
FIG. 3 illustrates a cross-section of an example pick-up tube of the urea injection system of FIG. 2.
Figure 4:
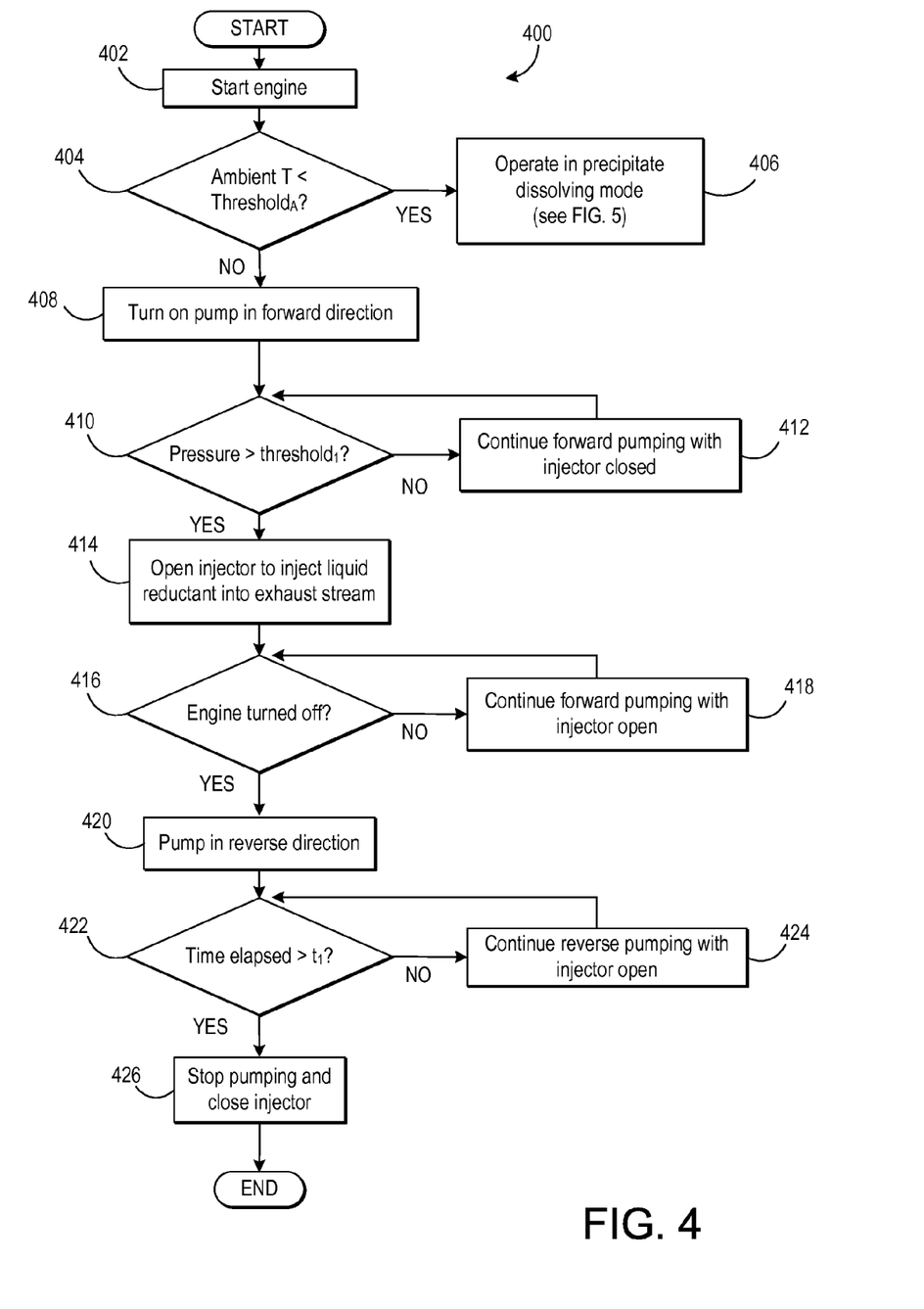
FIG. 4 is a flow chart of an example method for operating the urea injection system of FIG. 2.
Figure 5:
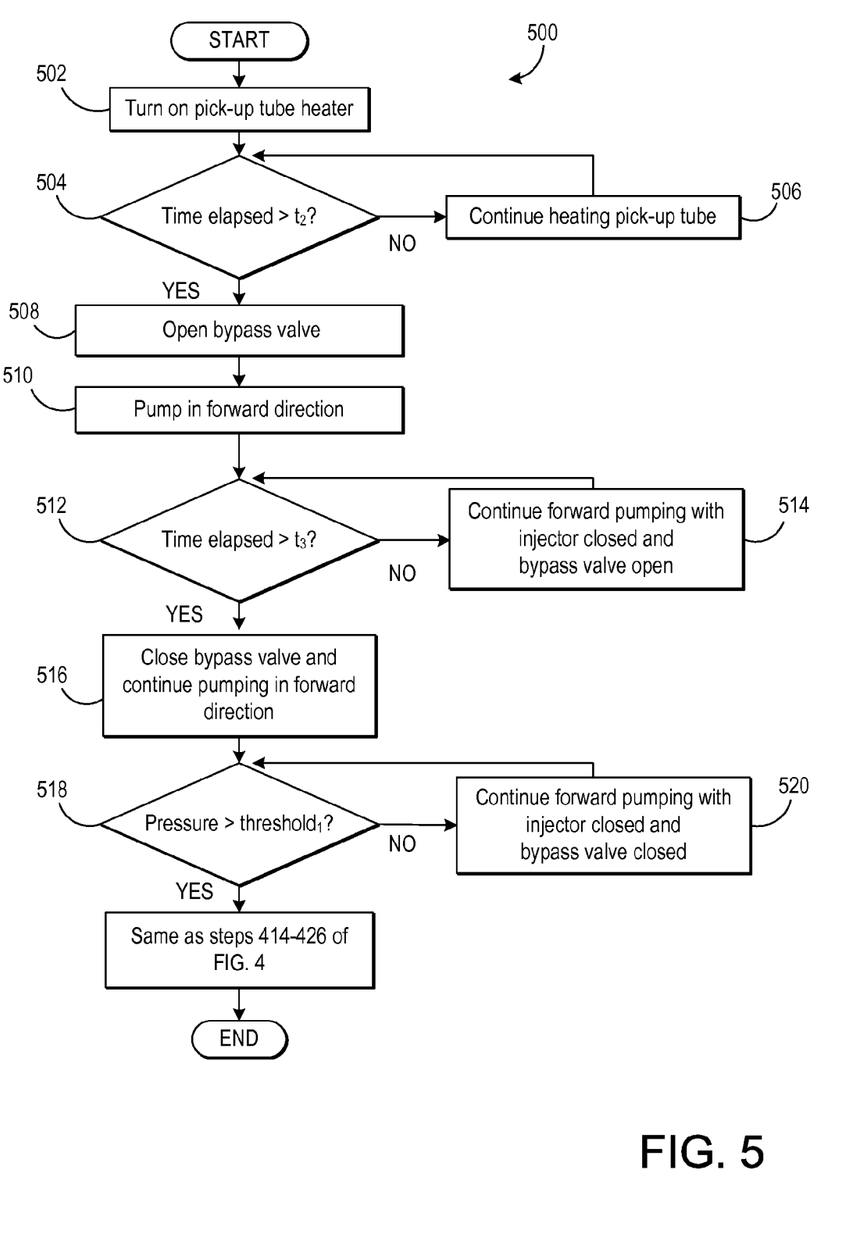
FIG. 5 is a flow chart for operating the urea injection system of FIG. 2 in a precipitate dissolving mode.

FIG. 1 includes an example exhaust system for a vehicle with a diesel engine including a urea injection system. FIG. 2 shows a more detailed view of the urea injection system. FIG. 3 shows a cross section of a heated pick up tube along the 3-3' axis of FIG. 2. FIG. 4 includes a flow chart of an example method for operating the urea injection system of FIG. 2 in either of a normal mode or a precipitate dissolving mode. FIG. 5 includes a flow chart of an example method for the precipitate dissolving mode.

More specifically, FIG. 1 illustrates an exhaust system 100 for transporting exhaust gases produced by internal combustion engine 110. As one non-limiting example, engine 110 includes a diesel engine that produces a mechanical output by combusting a mixture of air and diesel fuel. Alternatively, engine 110 may include other types of engines such as gasoline burning engines, among others.

Exhaust system 100 may include one or more of the following: an exhaust manifold 120 for receiving exhaust gases produced by one or more cylinders of engine 110, a mixing region 130 arranged downstream of exhaust manifold 120 for receiving a liquid reductant, a selective catalytic reductant (SCR) catalyst 140 arranged downstream of the mixing region 130, and a noise suppression device 150 arranged downstream of catalyst 140. Additionally, exhaust system 100 may include a plurality of exhaust pipes or passages for fluidically coupling the various exhaust system components. For example, as illustrated by FIG. 1, exhaust manifold 120 may be fluidically coupled to mixing region 130 by one or more of exhaust passages 162 and 164. Catalyst 140 may be fluidically coupled to noise suppression device 150 by exhaust passage 166. Finally, exhaust gases may be permitted to flow from noise suppression device 150 to the surrounding environment via exhaust passage 168. Note that while not illustrated by FIG. 1, exhaust system 100 may include a particulate filter and/or diesel oxidation catalyst arranged upstream or downstream of catalyst 140. Furthermore, it should be appreciated that exhaust system 100 may include two or more catalysts.

In some embodiments, mixing region 130 can include a greater cross-sectional area or flow area than upstream exhaust passage 164. Mixing region 130 may include a first portion 132 and a second portion 134. The first portion 132 of mixing region 130 may include an injector 136 for selectively injecting a liquid into the exhaust system. The second portion 134 of mixing region 130 may be configured to accommodate a change in cross-sectional area or flow area between the first portion 132 and the catalyst 140. Note that catalyst 140 can include any suitable catalyst for reducing NOx or other products of combustion resulting from the combustion of fuel by engine 110.

The injector 136 is a part of a liquid reductant injection system 200. As one non-limiting example, the liquid injected by the injector 136 may include a liquid reductant 178, such as a urea solution. In one specific example, the liquid reductant comprises an aqueous urea and ethanol solution. More specifically, the liquid reductant may comprise an aqueous solution which is 32.5% urea, 25% ethanol, and 42.5% water. As such, in this specific example, the freezing point of the liquid reductant is approximately −30° C. The liquid reductant 178 may be supplied to injector 136 through conduit 174 from a storage tank 176 via a pump 172. The liquid reductant 178 may be returned to the storage tank 176 via a reductant return line 180. In the present embodiment, the pump 172 is a reversible pump, however in an alternate embodiment, the liquid reductant injection system may include a second pump, which pumps liquid reductant in an opposite direction of the pump 172.

Note that with regards to vehicle applications, exhaust system 100 may be arranged on the underside of the vehicle chassis. Additionally, it should be appreciated that the exhaust passage may include one or more bends or curves to accommodate a particular vehicle arrangement. Further still, it should be appreciated that in some embodiments, exhaust system 100 may include additional components not illustrated in FIG. 1 and/or may omit components described herein.

FIG. 2 illustrates a more detailed depiction of the liquid reductant injection system 200. As described above, the liquid reductant 178 is stored in the storage tank 176. In the example where the liquid reductant comprises the aqueous urea and ethanol solution described above, the urea is fully dissolved in the water-ethanol solution at temperatures above 0° C.; however, when cooled to temperatures less than 0° C. to −5° C., the urea may at least partially precipitate out of solution, as urea precipitate 222. In one example, the urea precipitate 222 settles at the bottom one third to the bottom one quarter of the storage tank 176. The example aqueous urea and ethanol solution, described above, has the advantage it does not freeze at −11° C. (the normal freezing temperature for a urea and water solution), and instead freezes at a decreased temperature of approximately −30° C.

Further, the liquid reductant injection system 200 has another advantage in that at temperatures below a threshold, such as 0° C. to −5° C., the system provides a mechanism for dissolving urea precipitate that does not require heating of the storage tank. For this purpose, as depicted in FIG. 2, the pump 172 is coupled to a pick-up tube 202. The pick-up tube extends into the lower one third to one quarter of the storage tank 176, wherein urea precipitate 222 may be located when the ambient temperature is less than the precipitation threshold of the liquid reductant. In the present embodiment, the pick-up tube 202 is a heated pick-up tube. One example configuration for a heated pick-up tube is shown in FIG. 3.

Specifically, FIG. 3 shows a cross section of one example conformation for a heated pick-up tube along the 3-3' axis of the pick-up tube 202, depicted in FIG. 2. In this example, the pick-up tube 202 comprises an outer tube 302, an inner tube 308, and an inner cylindrical space 310, which is a space within the inner tube 308. The inner cylindrical space 310 has a conical opening 312 at a suction end 320, wherein the liquid reductant 178 may enter into the cylindrical space 310 via suction/negative pressure generated by the pump 172. In an alternate embodiment, pick-up tube may be cylindrical at the suction end and include a conical portion as a separate attached piece. An opposing end 322, opposite of the suction end 320, is coupled to the pump 172, as shown in FIG. 2.

Returning to FIG. 3, an air gap 304 is disposed between the outer tube 302 and the inner tube 308, and a heat tape layer 306 is disposed on the outer surface of the inner tube 308. The heat tape layer 306 may include an electrical element connected to a power source of the vehicle to provide heat in the region of the inner tube 308. The air gap 304 may reduce heat loss via conduction of heat from the outer tube 302 to the storage tank 176, and may prevent the liquid reductant from coming into contact with the heat tape layer 306. Thus, in this example the air gap provides efficient use of electricity in heating of the pick-up tube, and protects the components of the heat tape from being degraded by the liquid reductant. In alternate embodiments, the pick-up tube 202 may have a different or additional heating mechanism, such as a coil type heater.

As shown in FIG. 2, the pick-up tube 202 and the pump 172 are regulated by a power control module (PCM) 206. The pump 172 is coupled to a delivery pipe 174 for transporting the liquid reductant 178 to the fuel injector 136, where the liquid reductant is injected into the exhaust gas flow path (now shown) as a reductant spray 220. The delivery pipe 174 includes a filter 218, which filters the liquid reductant, particularly in ambient conditions below the threshold where urea precipitate may be present in the liquid reductant. The delivery pipe 174 further includes a pressure sensor 216, which sends a liquid reductant pressure signal to the PCM 206. In the present embodiment the pressure sensor is disposed between the pump 172 and the filter 218, proximal to the filter; however, in alternate embodiments the pressure sensor may be at a different location, such as a location between the filter 218 and the injector 136.

The injector 136 is further coupled to the reductant return line 180. Opening and closing of the injector 136 is regulated by the PCM 206. The reductant return line 180 is coupled to a pressure regulator 212 at an opposing end. When the pressure is greater than a preset threshold, the pressure regulator 212 may open to relieve pressure that may otherwise damage the liquid reductant injection system 200. A bypass line 210 and a bypass valve 208, which controls opening and closing of the bypass line 210, are coupled to the return line 180 and provide a bypass around the pressure regulator 212. Opening and closing of the bypass valve 208 is regulated by PCM 206. Further, pressure regulator 212 is controlled by PCM 206. As such, a pressure threshold may be set for the pressure regulator via the PCM, and the pressure threshold may be varied by the PCM. Additionally, for operation of the liquid reductant injection system, the PCM may receive an ambient temperature signal from a temperature sensor (not shown). In an alternate embodiment, the pressure regulator may be a mechanically controlled pressure regulator with a static pressure threshold.

A method 400 for operating the liquid reductant injection system 200 is shown in the flow chart of FIG. 4. First, at 402 the engine of the vehicle is started, signaling to the PCM that liquid reductant injection is requested to treat exhaust gases. At 404, the PCM determines if the ambient temperature is greater than a threshold$_4$. In one example, the threshold$_4$ is in the range of 0° C. to −5° C. For example, in the above described aqueous urea and ethanol solution, the freezing temperature is −30° C. and precipitation of urea may occur at temperatures less than 0° C. to −5° C. If the ambient temperature is less than the threshold$_4$, the liquid reductant injection system is operated in a precipitate dissolving mode at 406. The precipitate dissolving mode is described in further detail with reference to method 500 of FIG. 5. If the ambient temperature is greater than the threshold$_4$, the liquid reductant injection system is operated in a normal operating mode, shown in steps 408-428.

At 408, the pump is turned on in the forward direction, wherein liquid reductant flows from the storage tank toward the injector. At 410, the PCM determines if the liquid reductant injection system pressure is greater than a threshold$_1$. In one example, a pressure of the threshold$_1$ is in the range of 4-10 bar. The threshold$_1$ may be a static pressure, such as 5 bar; however, in an alternate embodiment, the threshold$_1$ may be adjusted to a higher pressure to improve atomization, and may be further adjusted to a lower pressure to reduce droplet size and speed evaporation of water from the aqueous urea solution. If the system pressure is less than the threshold$_1$, the pump continues to pump in the forward direction with the injector closed in 412, until the pressure reaches the threshold$_1$ in 410. When the system pressure is greater than the threshold$_1$, the pump continues to pump in the forward direction and the injector is opened in 414, such that reductant is injected into the exhaust stream for reduction of NOx.

Injection continues until the engine is turned off, as shown in 416-420, where the PCM determines that the engine is off. After the engine is off in 416, the pump is switched to pumping in the reverse direction in 420, wherein liquid reductant flows from the injector toward the storage tank. Thus liquid reductant is removed from the delivery pipe and the return pipe in an air-purging procedure. In the alternate embodiment described above, wherein the liquid reductant injection system includes two separate pumps, a first pump for pumping in the forward direction and a second pump for pumping in the reverse direction, at step 420, the first pump is turned off and the second pump is turned on.

Next, it is determined if a time$_1$ has elapsed in 422. In one example, time$_1$ is 20-40 seconds. If the time$_1$ has not elapsed, the pump continues running in the reverse direction with the injector open in 424. After the time$_1$ has elapsed, the pump is stopped at 426, and the method ends. In an alternate embodiment, the injector may be open during pumping in the reverse direction and closed when pumping is stopped. It will be appreciated that in the normal mode, the pressure regulator pressure limit may be set by the PCM and the pressure regulator bypass valve remains closed. Further, the pressure regulator is only opened if the pressure goes above the preset pressure limit to protect the liquid reductant injection system from damage caused by high pressure.

As described briefly above, if at 404 the ambient temperature is less than a threshold$_4$, such as a temperature less than 0° C., the liquid reductant injection system is operated in a precipitate dissolving mode, shown as method 500 of FIG. 5. In method 500, the pick-up tube heater is turned on at 502. For example, an electrical current may be applied to the heat tape layer of the pick-up tube. The pick-up tube continues heating in 506, until the PCM determines that a time$_2$ has elapsed in 504. In one example, the time$_2$ is one minute. After the time$_2$ has elapsed, the pressure regulator bypass valve is opened and the pump is operated in the forward direction (as described above) while the injector is closed, at 508 and 510, respectively. Thus, the liquid reductant is recirculated through the liquid reductant injection system, and as it is recirculated, the liquid reductant is warmed via the pick-up tube to dissolve urea precipitate that may have accumulated at the bottom of the storage tank.

Recirculation is continued by continuing forward pumping with the injector valve closed and the pressure regulator bypass valve open in 514, until the PCM determines that a time$_3$ has elapsed in 512. In one example, the time$_3$ is two minutes. Next, the regulator bypass valve is closed and the pump continues to operate in the forward direction, at 516. Forward pumping with the bypass valve and injector closed is continued in 520, until the PCM determines that the liquid reductant injection system pressure is greater than the threshold$_1$ in 518. It should be noted that step 518 and 520 of method 500 are substantially the same as steps 410 and 412 of method 400. Thus, method 500 continues from 518 and 520 to steps 414-426 of method 400, shown in FIG. 4, to carry out injection of reductant solution into the exhaust gas stream while the engine is running, and air purging of the liquid reductant injection system when the engine is turned off.

The above described system and method provide increased protection against freezing of a liquid reductant solution by reducing the freezing point temperature of the solution. Further, the system and method provide an efficient means of warming reductant solution and preventing clogging of delivery and return lines in the liquid reductant injection system. In one embodiment, the liquid reductant is comprised of urea, ethanol, and water rather than urea and water alone, reducing the freezing point temperature. In one example, the freezing point temp may be reduced from −11° C. to −30° C.

Further, even if the ambient temperature is below a threshold temperature, resulting in precipitation of urea, the liquid reductant injection system may be operated in a precipitate dissolving mode, alternative to a normal operating mode. In the liquid reductant injection system, an electrically heatable pick-up tube may be provided coupled to a pump and a pressure regulator bypass valve and pathway may be provided on a return line. Thus, in the precipitate dissolving mode the reductant may be recirculated with the pump operating in the forward direction, the bypass valve opened, the injector closed, and the electrically heatable pick-up tube warmed in order to dissolve urea precipitate.

In one example embodiment, the pick-up tube includes an inner tube and an outer tube with an air space disposed between the inner tube and the outer tube. A layer of heat tape is disposed on the outer surface of the inner tube, within the air space. When subjected to suction from the pump, liquid reductant is drawn into the pick-up tube and contacts an inner surface of the inner tube. Heat is conducted from the heat tape to the liquid reductant via the inner tube when an electrical current is applied to the heat tape when the ambient temperature is determined to be below a threshold. The air space prevents heat from being conducted from the heat tape to the storage tank via the outer tube. Further, the air space prevents liquid reductant from contacting and damaging components of the heat tape. As the liquid reductant is recirculated and warmed through the liquid reductant injection system, urea precipitate is dissolved. Thus, the liquid reductant solution is at a desired urea concentration when it is injected into the exhaust treatment pathway for NOx reduction in exhaust gases.

Furthermore, the liquid reductant injection system may include a reversible pump or a second pump, which directs reductant in an opposite direction relative to the pumping direction of the first pump, as described above. After the engine is turned off, the injector may be closed and the liquid reductant injection system subjected to pumping in the reverse direction. Thus, the liquid reductant may be removed from the delivery line and the return line, preventing precipitation and/or freezing of reductant, which may otherwise cause clogging in the delivery line and the return line when the ambient temperature is below the precipitation or freezing points of the liquid reductant solution.

In addition to the liquid reductant having a reduced freezing point temperature, the above described system and method may have other advantages. For example, cost of heating components may be reduced, as only the pick-up tube is heated, rather than heating the entire storage tank. Also, cost may be reduced because components, other than the pick-up tube, do not require a freeze-safe design associated with protection of the system components over multiple freeze/thaw cycles. In another example, the storage tank size may be reduced to a more useable volume due to use of less insulation in the storage tank walls and reduction of vapor space needed to accommodate reductant expansion during ice formation.

In yet another example, suppression of the liquid reductant freezing point temperature may result in the urea concentration value being independent from the freezing point. This may allow higher content of chemical reductant due to an ability to operate with increased concentration of reductant for a given volume. A more useable volume may allow for extended driving distance between urea refills, reducing vehicle maintenance costs. In even another example, the more useable volume and/or higher concentration of reductant may allow for increasing the burden of NOx reduction on the exhaust aftertreatment system, while simultaneously reducing the burden of NOx reduction required from the engine combustion system. This may reduce the amount of exhaust gas recirculation, further improving vehicle fuel economy.

Furthermore, the evaporative properties of ethanol in the liquid reductant solution may provide advantages. For example, the liquid reductant solution may have the ability to form gaseous fractions ($NH_3$ and $HNCO$) due to faster evaporation of the liquid fraction containing ethanol, the ethanol having a lower boiling point compared to the water part. This may reduce the residence time required for droplet evaporation and permit use of a shorter mixing length, thus improving aftertreatment packaging space availability. In another example, the liquid reductant solution may have the ability to reduce the amount of heat required from the exhaust gas to evaporate reductant solution droplets due to a lower specific heat capacity of ethanol compared to water. This may also contribute to reducing the residence time required for droplet evaporation and permit use of a shorter mixing length, again improving aftertreatment packaging and space availability. Further still, because of the lower boiling point of the ethanol solution, the liquid reductant solution may have the ability to form fewer deposits on the surfaces of reductant spray mixers and inner walls of exhaust pipes due to faster evaporation of reductant droplets.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The invention claimed is:

1. A method for treating engine exhaust, comprising:
   storing a solution of ethanol, water, and urea in a storage tank;
   drawing the solution into an electrically heatable pick-up tube for delivery via a delivery line and an injector to the exhaust by operating a pump in a first direction; and
   clearing a return line that returns the solution, or the delivery line, by operating the pump in a second, reverse, direction;
   wherein the pick-up tube comprises an inner tube and an outer tube, an air space disposed between the inner tube and the outer tube and a layer of heat tape disposed on an outer surface of the inner tube.

2. The method of claim 1 further comprising, determining if an ambient temperature is greater than a precipitation threshold of the solution.

3. The method of claim 2 further comprising, operating a reductant injection system in a first mode if the ambient temperature is less than the precipitation threshold, and operating the reductant injection system in a second mode if the ambient temperature is greater than the precipitation threshold.

4. The method of claim 3, wherein the first mode comprises applying an electrical current to the electrically heatable pick-up tube for a first duration of time.

5. The method of claim 4, wherein the first mode further comprises opening a pressure regulator bypass valve in the return line, maintaining the injector in a closed position, and warming the solution by drawing the solution into the electrically heatable pick-up tube for recirculation to the storage tank for a second duration of time.

6. The method of claim 5, wherein the first mode further comprises closing the pressure regulator bypass valve, maintaining the injector in a closed position, and drawing the solution into the electrically heatable pick-up tube via operating the pump in the first direction for increasing a reductant injection system pressure until the reductant injection system pressure is greater than a threshold.

7. The method of claim 6, wherein the first mode further comprises, when the reductant injection system pressure is greater than the threshold, opening the injector and injecting the solution into a pathway of the exhaust.

8. The method of claim 3, wherein the second mode comprises maintaining the injector in a closed position, maintaining a pressure regulator bypass valve in a closed position, maintaining a non-heated state of the electrically heatable pick-up tube, and drawing the solution into the electrically heatable pick-up tube via operating the pump in the first direction for increasing a reductant injection system pressure until the reductant injection system pressure is greater than a threshold.

9. The method of claim 8, wherein the second mode further comprises, when the reductant injection system pressure is greater than the threshold, opening the injector and injecting the solution into a pathway of the exhaust.

10. The method of claim 1 further comprising, after engine shutdown, maintaining a pressure regulator bypass valve in a closed position, and clearing the return line that returns the solution or the delivery line by operating the pump in the second, reverse, direction, and then closing the injector.

11. A method for treating engine exhaust via a reductant injection system, the method comprising:
during a cold start,
applying an electric current to an electrically heatable pick-up tube for a first duration of time,
after the first duration of time, opening a pressure regulator bypass valve, maintaining a closed position of an injector, and operating a pump in a first direction to warm and recirculate a reductant solution for a second duration of time,
after the second duration of time, closing the pressure regulator bypass valve, maintaining a closed position of the injector, and operating the pump in the first direction to increase a reductant injection system pressure until the reductant injection system pressure is greater than a threshold, and
after the reductant injection system pressure is greater than the threshold, opening the injector, maintaining the pressure regulator bypass valve in a closed position, and operating the pump in the first direction to spray the reductant solution into an exhaust pathway;
during a warmer start,
maintaining a closed position of the pressure regulator bypass valve, maintaining a closed position of the injector, and operating the pump in the first direction to increase a reductant injection system pressure until the reductant injection system pressure is greater than a threshold, and
after the reductant injection system pressure is greater than the threshold, opening the injector, maintaining the pressure regulator bypass valve in a closed position, and operating the pump in the first direction to spray the reductant solution into an exhaust pathway; and
during engine shutdown, closing the injector, maintaining a closed position of the pressure regulator bypass valve, and operating the pump in a second, reverse, direction to clear a delivery line and a return line of reductant solution;
wherein the electrically heatable pick-up tube comprises an inner tube and an outer tube, an air space disposed between the inner tube and the outer tube and a layer of heat tape disposed on an outer surface of the inner tube.

12. The method of claim 11, wherein the reductant solution comprises water, ethanol, and urea.

13. The method of claim 11, wherein a first end of the pick-up tube is coupled to the pump and a second opposing end of the pick-up tube is extended into a storage tank for the reductant solution.

14. An exhaust system for an engine, comprising:
an exhaust passage receiving engine exhaust gas; and
a liquid reductant injection system for injecting a liquid reductant into the exhaust passage, comprising:
an injector for injecting the liquid reductant into the exhaust passage,
a storage tank for storing the liquid reductant,
a reversible pump, and
an electrically heatable pick-up tube coupled to the reversible pump and including a heating mechanism for drawing the liquid reductant out of the storage tank for delivery to the injector;
wherein the electrically heatable pick-up tube comprises an inner tube and an outer tube, an air space disposed between the inner tube and the outer tube and a layer of heat tape disposed on an outer surface of the inner tube.

15. The system of claim 14, wherein the liquid reductant injection system further comprises a return line including a pressure regulator and a pressure regulator bypass valve.

16. The system of claim 14, wherein the liquid reductant comprises water, ethanol, and urea.

17. A method for treating engine exhaust with a liquid reductant injection system, the method comprising:
storing a reductant solution of ethanol, water, and urea in a storage tank;
during a first mode, drawing the stored solution into an electrically heatable pick-up tube and recirculating the reductant solution back to the storage tank without delivery to the engine exhaust by bypassing a pressure regulator in the liquid reductant injection system;
after the first mode, implementing a second mode by discontinuing bypass of the pressure regulator and operating the pressure regulator to regulate injector pressure while delivering the reductant solution to the engine exhaust; and
during engine shutdown, stopping injection of the reductant solution and applying a negative pressure to clear a return line and a delivery line of the liquid reductant injection system;
wherein the electrically heatable pick-up tube comprises an inner tube and an outer tube, an air space disposed between the inner tube and the outer tube and a layer of heat tape disposed on an outer surface of the inner tube.

* * * * *